US008880596B2

(12) United States Patent
Wang

(10) Patent No.: US 8,880,596 B2
(45) Date of Patent: Nov. 4, 2014

(54) SOFTWARE PLATFORM AND METHOD FOR PROCESSING UNSTRUCTURED DATA

(71) Applicant: Beijing Sursen International Information Technology Co., Ltd., Beijing (CN)

(72) Inventor: Donglin Wang, Beijing (CN)

(73) Assignee: Beijing Sursen International Information Technology Co., Ltd., Beijing (CN)

( * ) Notice: Subject to any disclaimer, the term of this patent is extended or adjusted under 35 U.S.C. 154(b) by 0 days.

(21) Appl. No.: 14/060,578

(22) Filed: Oct. 22, 2013

(65) Prior Publication Data
US 2014/0047017 A1 Feb. 13, 2014

Related U.S. Application Data

(63) Continuation of application No. 13/182,566, filed on Jul. 14, 2011, now abandoned, which is a continuation of application No. PCT/CN2010/070221, filed on Jan. 15, 2010.

(30) Foreign Application Priority Data

Jan. 16, 2012 (CN) .......................... 2009 1 0076749

(51) Int. Cl.
G06F 15/16 (2006.01)
H04L 29/06 (2006.01)
G06F 9/54 (2006.01)

(52) U.S. Cl.
CPC ................ H04L 67/42 (2013.01); G06F 9/547 (2013.01)
USPC ......................................... 709/203

(58) Field of Classification Search
None
See application file for complete search history.

(56) References Cited

U.S. PATENT DOCUMENTS

| 7,376,670 | B2* | 5/2008 | Badt et al. .............................. 1/1 |
| 7,667,702 | B2* | 2/2010 | Vion-Dury .................... 345/441 |
| 7,739,587 | B2* | 6/2010 | Vion-Dury .................... 715/217 |
| 7,752,538 | B2* | 7/2010 | Vion-Dury .................... 715/228 |
| 7,882,245 | B2* | 2/2011 | Wang et al. .................... 709/227 |
| 8,090,739 | B2* | 1/2012 | Dettinger et al. ............. 707/769 |
| 2005/0197995 | A1* | 9/2005 | Badt et al. ......................... 707/1 |
| 2006/0085436 | A1* | 4/2006 | Dettinger et al. ............. 707/100 |
| 2007/0100981 | A1* | 5/2007 | Adamczyk et al. ........... 709/223 |
| 2007/0139429 | A1* | 6/2007 | Vion-Dury .................... 345/581 |
| 2007/0288539 | A1* | 12/2007 | Vion-Dury .................... 708/200 |
| 2008/0028291 | A1* | 1/2008 | Vion-Dury .................... 715/228 |
| 2008/0189303 | A1* | 8/2008 | Bush et al. .................... 707/100 |

* cited by examiner

Primary Examiner — Brian P Whipple
(74) Attorney, Agent, or Firm — Ellahie & Farooqui LLP

(57) ABSTRACT

A software platform and a method for processing unstructured data are provided. The software platform includes a server and a client The client is configured to receive a predefined command from an application software, call a function which is corresponding to the predefined command and which is in the client and/or in a server through network communications with the server to perform an operation: and the server is configured to perform network communications with the client and provide the function when called by the client. According to the present invention, function loads can be distributed reasonably between the server and the client and each function module can be deployed reasonably, and thereby the working efficiency of the software platform can be improved. Meanwhile, the software platform is extended to he applied to a network, which provides a foundation and convenience for other applications based on the software platform in the network.

21 Claims, 3 Drawing Sheets

SOFTWARE PLATFORM AND METHOD FOR PROCESSING UNSTRUCTURED DATA

CROSS-REFERENCE TO RELATED APPLICATIONS

The application is a continuation of U.S. patent application Ser. No. 13/182,566 (filed Jul. 14, 2011), which claims priority to PCT/CN2010/070221 (filed on Jan. 15, 2010), which claims priority of Chinese patent application No. 200910076749.3 (filed Jan. 16, 2009), the contents of which are incorporated herein by reference.

FIELD OF THE INVENTION

The present invention relates to data processing techniques, and particularly to a software platform and a method for processing unstructured data.

BACKGROUND OF THE INVENTION

Conventional document processing software has many disadvantages including poor universality, inconvenience in retrieving document information, lack of uniform access interfaces, poor data compatibility and high cost, poor support of transplantation and poor flexibility, imperfect technique for page layout, and limited search means, and so on. PCT application No. PCT/CN2006/003294 provides a document processing system to address the above problems.

The PCT application does not use conventional document processing techniques where both the user interface and document storage are implemented by the same software. Instead, the PCT application divides a document processing system into an application layer, an interface layer and a docbase system layer. FIG. 1 is a schematic illustrating a structure of a document processing system. According to FIG. 1, the document processing system mainly includes application software, an interface layer, a docbase system layer and a storage device.

The application software includes any existing document processing and contents managing software. The application software is in the application layer of the document processing system, and implements operations on a document by sending a command which conforms to an interface layer standard (also called interface standard). The interface standard defines at least one command for manipulating document data, and also defines a manner of the application software sending the command to the docbase system. The interface standard may also be called a docbase standard, and an interface based on the interface standard may be called a docbase standard interface or a standard interface of the docbase system. The docbase system layer is a core layer of the document processing system, and is for performing document processing operations according to docbase standard-based commands received from the application software and returning a processing result conforming to the docbase standard to the application software.

The storage device stores documents and is usually a hard disk or a. memory, or may be a CD, flash memory, floppy disk or magnetic tape, or a remote storage device, as long as the storage device is capable of storing data. The documents stored in the storage device, i.e. the data stored in the docbase system may be called a docbase, i.e., the documents are the data which may be stored and retrieved through the docbase standard interface, The documents are usually called documents conforming to the docbase standard. In other words, the storage format of the documents is supported by the software supporting the docbase standard.

As mentioned above, the docbase system is the core layer in the document processing system. The docbase system, being a type of platform software, provides functions such as storing, reading/writing, parsing, presenting, organizing, security ensuring and searching of the unstructured documents (unstructured data or unstructured information), and can be called by an application software via the standard interface. The unstructured documents processed by the docbase system may include print media information composed of one or multiple pages, or steam media information such as audio or video, or other information.

SUMMARY OF THE INVENTION

An objective of the present invention provides a software platform and a method for processing unstructured data, which are applicable for unstructured data processing in a network. To achieve the above objective, the technical solution of the present invention includes the following aspects.

A software platform for processing unstructured data includes a server and a client;

the client is configured to receive a predefined command from an application software, call a function corresponding to the predefined command in the client and/or in the server by performing network communications with the server according to the predefined command to carry out an operation; and the server is configured to perform network communications with the client and provide the function when called by the client;

wherein the predefined command is independent from the storage form of unstructured data, A method for processing unstructured data includes;

receiving, by a client, a predefined command from an application software, calling a function corresponding to the command in the client and/or in a server by performing network communications with the server according to the predefined command to carry out an operation; and providing, by the server, the function when called by the client;

wherein the predefined command is independent from a. storage form of the unstructured data, A software platform for processing unstructured data includes two clients and a server;

Wherein a first client of the two clients is configured to receive a first sequence of predefined commands from first application software, and create unstructured data in the server according to the first sequence of predefined commands;

a second client of the two clients is configured to receive a second sequence of predefined commands from a second application software; and provide, according to the second sequence of predefined commands, the second application software with data required by the second application software in the unstructured data created by the first client in the server;

the server is configured to store the unstructured data, communicate with the two clients over a network and provide a function when called by the two clients;

wherein a predefined command is independent from a storage form of the unstructured data.

A method for processing unstructured data includes:

receiving, by a first client, a first sequence of predefined commands from first application software, and creating unstructured data in a server according to the first sequence of predefined commands;

receiving, by a second client, a second sequence of predefined commands from second application software; and providing, according to the second sequence of predefined commands, the second application software with some data needed by the second application software among the unstructured data created by the first client in the server;

storing, by the server, the unstructured data, and providing a function when called by the first client and the second client.

As can be seen from the above technical solution, according to the software platform and the method for processing unstructured data in the present invention, function loads can be distributed between the server and the client reasonably and each function module can be deployed properly, and thereby the software platform under C/S mode can operate properly, and working efficiency of the software platform can be improved. Meanwhile, the software platform is extended to be applied to a network, which provides foundation and convenience for extending other applications in the network-based software platform, for example, data sharing between multiple clients can be realized.

DETAILED DESCRIPTION OF THE INVENTION

The present invention will be described hereinafter in detail with reference to accompanying drawings and embodiments.

The document processing system in an embodiment of the present invention can process not only document data, but also other unstructured data such as audio, video and multi-dimensional models by using the same principles. As such, the "document processing system" mentioned in the background of the invention is actually an "unstructured data processing system". In addition, the "docbase system" mentioned in the background of the invention can also be called a "software platform" due to its universality.

Figure 1:
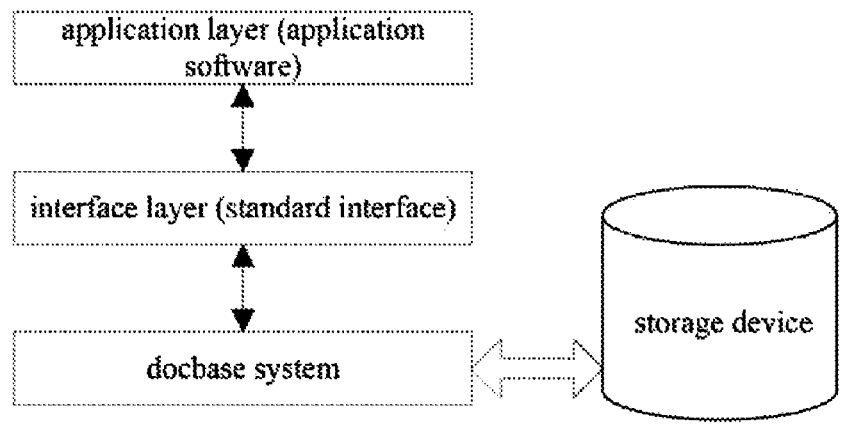
FIG. 1 is a schematic of a structure of a document processing system according to the prior art.
Figure 2:
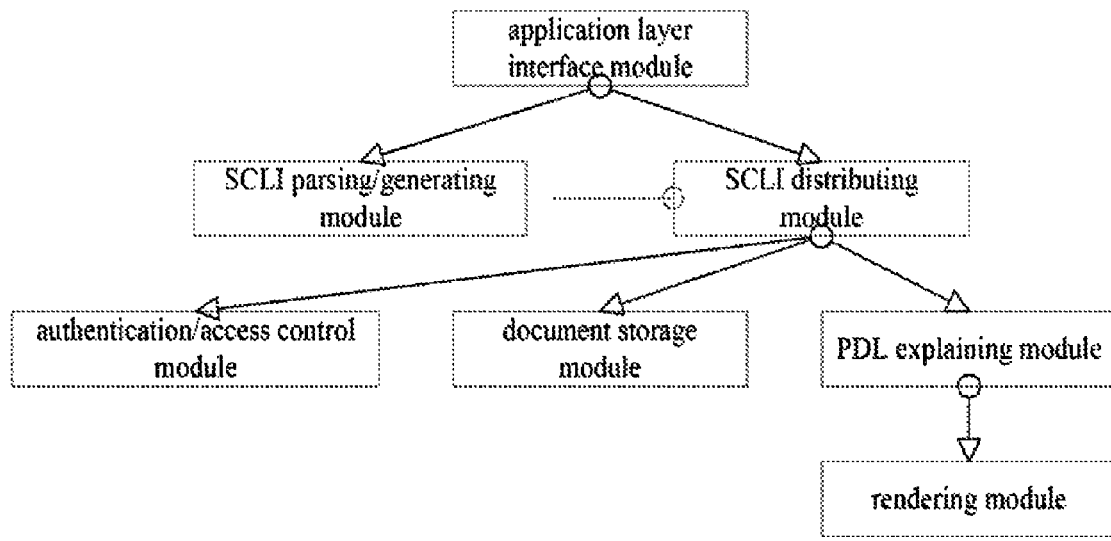
FIG. 2 is a schematic of function modules of a software platform provided by embodiment one of the present invention.

FIG. 2 is a schematic of function modules of a software platform provided by embodiment one of the present invention. Referring to FIG. 2, the start point of an arrow between two modules is attached to a calling module and the end point of the arrow is attached to a called module. The software platform in FIG. 2 includes: an application layer interface module, an SCLI parsing/generating module, an SCLI distributing module, an authentication/access control module, a document storage module, a Page Description Language (PDL) explaining module, and a rendering module.

The application layer interface module is configured to provide an application software with an interface for accessing the software platform. The application layer interface module receives a command sent from the application software through an interface layer and returns a result of executing the command to the application software through the interface layer. As mentioned above, both the command from the application software and the result returned from the software platform to the application software conform to the interface standard of the interface layer. The interface standard of the interface layer is called Standard Call Level Interface (SCLI) in the embodiments, and both the command from the application software and the result returned from the software platform to the application software are called SCLI protocol package. Specifically, the application layer interface module implements the following functions: calling a SCLI parser in the SCLI parsing/generating module to parse SCLI protocol package sent from the application software, sending a parsing result to the SCLI distributing module for processing, and returning an. SCLI protocol package from the SCLI distributing module to the application software.

The SCLI parsing/generating module includes an SCLI parser and an SCLI generator. The SCLI parser is configured to parse the SCLI protocol package from the application software and the SCLI generator is configured to generate an SCLI protocol package in line with data which is inputted into the SCLI generator.

The SCLI distributing module is configured to call a function, module in the software platform corresponding to the contents in the SCLI protocol package, call the SOLI generator in the SCLI parsing/generating module to encapsulate a result returned from the invoked function module into the SCLI protocol package, and return the SCLI protocol package to the application layer interface module.

The authentication/access control module is configured to provide functions of authentication and access control when called by the SCLI distributing module.

The document storage module is configured to provide functions including storage and managements of document and etc. when called by the SCLI distributing module.

The PDL explaining module is configured to traverse contents on a document page when called by the SCLI distributing module, and call the rendering module according to a command on the document page to generate a bitmap.

The rendering module, which is generally a Raster Image Processor (RIP), is configured to provide a 2-dimensional (2d) rendering function when called by the PDL translation module.

The design of function modules in the software platform shown in FIG. 2 is merely a logic-model of the software platform, and is designed for implementation by a single machine, which does not take into account how to implement the software platform in specific environment, for example, it is not taken into account how to implement, the software platform in a network.

Compared with the single-machine environment, the Client/Server (CS) mode may be introduced into a network to implement the software platform. The C/S mode introduces a series of complicated problems, such as how to implement network communications between the client and the server and how to arrange and deploy the function modules, and so on. For example, under the C/S mode, the client and the server communicate with each other over the network, and the processing speed of network communications is remarkably slower than the processing speed of CPU and I/O within a local machine. Therefore, function, loads need to be reasonably distributed between the client and the server and the function modules need to be reasonably deployed to make the software platform runs properly under the C/S mode. However, these problems need not be taken into account when it comes to the software platform under single-machine mode.

Therefore, for the software platform under the C/S mode, it is still an underlying problem as to how to organize and deploy the function modules of the software platform at the client side and at the server side to make the software platform provide each function more effectively.

An embodiment of the present invention further provides a software platform and a method in the C/S mode, through which functional loads are reasonably distributed between the client side and the server side, and function modules are reasonably deployed at the client side and at the server side. That will be enable the software platform in the C/S mode to operate properly, and Improve working efficiency of the software platform, and extend applicable environments of the software platform.

In the present invention, the application software calls the software platform by sending a predefined command to the software platform. The command may be sent in the form of a command string, or by function calling or in other ways. The predefined command is independent from a storage form (especially a storage format) of an unstructured document, and describes an operation on an instance of an abstract model. The abstract model is obtained by abstracting a universal feature (e.g. presence effect) of a certain type of unstructured documents (such as written documents, audio, video, 3D models). An instance of the abstract model generally has a tree structure. Preferably, the predefined command may be defined based on actions and objects. After the software platform receives an operation command, an abstract operation on an instance of an abstract model described by the operation command is mapped onto a physical operation (i.e. actual operation) on the storage data, and the physical operation is carried out.

Referring to Chinese Patent Application No. 2005101310720 of the present applicant, the docbase standard published core techniques for processing an. unstructured document to application software, so that an ordinary software manufacturer which does not master the core techniques can develop software relevant to the unstructured document, thus realizing an industrial separation between the core techniques and the application techniques. Meanwhile, different software supporting the docbase standard can further call the same software platform to process the same unstructured document, and the same software can also call different software platforms to process unstructured documents in different formats, which realizes interoperability and facilitate information interaction and communication.

The software platform in accordance with the present invention has complete functions, and can generate an unstructured document with a common feature having any valid value. For example, when the abstract model is obtained by abstracting the presence effects, the client may generate unstructured data with any presence effects. That is, the client may create the unstructured data with any designated presence effects by sending a series of commands to the software platform, and the unstructured data have the same or similar presence effects. "Similar" means that the difference is smaller than a predefined threshold. The causes of "similar" may include that image data are compressed with distortion or that coordinates have limited precision, or factors related with the software and running environments of the software, or even factors related with the displaying device (such as resolution and color difference and so on). As long as the difference is as small as can be omitted considering requirements of a specific application, it can be regarded to be "similar". In other words, the definition of "similar" depends on the requirements of the application.

Embodiments of the present invention describe implementation of the software platform and the method under the C/S mode, including: dividing of functions among modules, and functions, interface, design and implementation of each module.

First of all, the software platform under the C/S mode in accordance with the present invention includes a server and a client. The client is configured to receive a predefined command from an application software, and carry out an operation through calling a function in the client and/or in a server which is corresponding to the predefined command by performing network communications with the server. The server is configured to communicate with the client over the network, and provide the function when called by the client. The predefined command, independent from the storage form of the unstructured data, is a command defined in advance for processing an instance of a predefined model and may trigger a physical operation on the unstructured data.

Preferably, the server is configured to store the unstructured data. The unstructured data may include: stream media data, such as varieties of audio and video data; and/or document data such as a 2-dimensional document, a 3-dimensional document and a multidimensional document. The client is configured to present the unstructured data, including: rendering, displaying, printing and playing, etc.

Further more, the server may be further configured to provide an authentication, function and an access control function. The access control function may be provided by the client Instead, and the client may support an unstructured data operation standard, such as Unstructured Operation Markup Language (UOML) standard.

In the software platform of an embodiment of the present invention, the server and the client may communicate with each other over the network based on a transportation protocol, such as Transfer Control Protocol (TCP), Hypertext Transfer Protocol (HTTP), User Package Protocol (UDP) or File Transfer Protocol (FTP). The server and the client may encrypt the network communications, for example, may encrypt part or all of data sent between the server and the client. The encryption may adopt a symmetric key generated randomly, and the symmetric key may be delivered by using an asymmetric key generated randomly to provide more security.

Preferably, the client is configured to present the unstructured data, and is configured to call the functions of the server, including the authentication function, the access control function, and the unstructured data storage or management function. The server is configured to provide the authentication function, the access control function, and the unstructured data storage or management function according to the calling from the client.

The above function division is based on the following considerations:

1, a large amount of data may be generated when being presented (such as page rendering). It will increase the burden between the server and the client when they are performing network communications with each other, if the presenting function is implemented by the server, and as a result, the working efficiency of the whole software platform will be much lower; therefore, the presenting function is provided by the client in this embodiment;

2, the authentication function and the access control function relates to the security of the whole software platform, while the server, compared with the client, has better reliability and security; therefore, the authentication function and the access control function are implemented by the server in this embodiment;

3, the unstructured data storage and management function is implemented by the sewer due to physical security considerations, such as for facilitating data sharing and for centralized managing, and for preventing theft of the data, etc.

Figure 3:
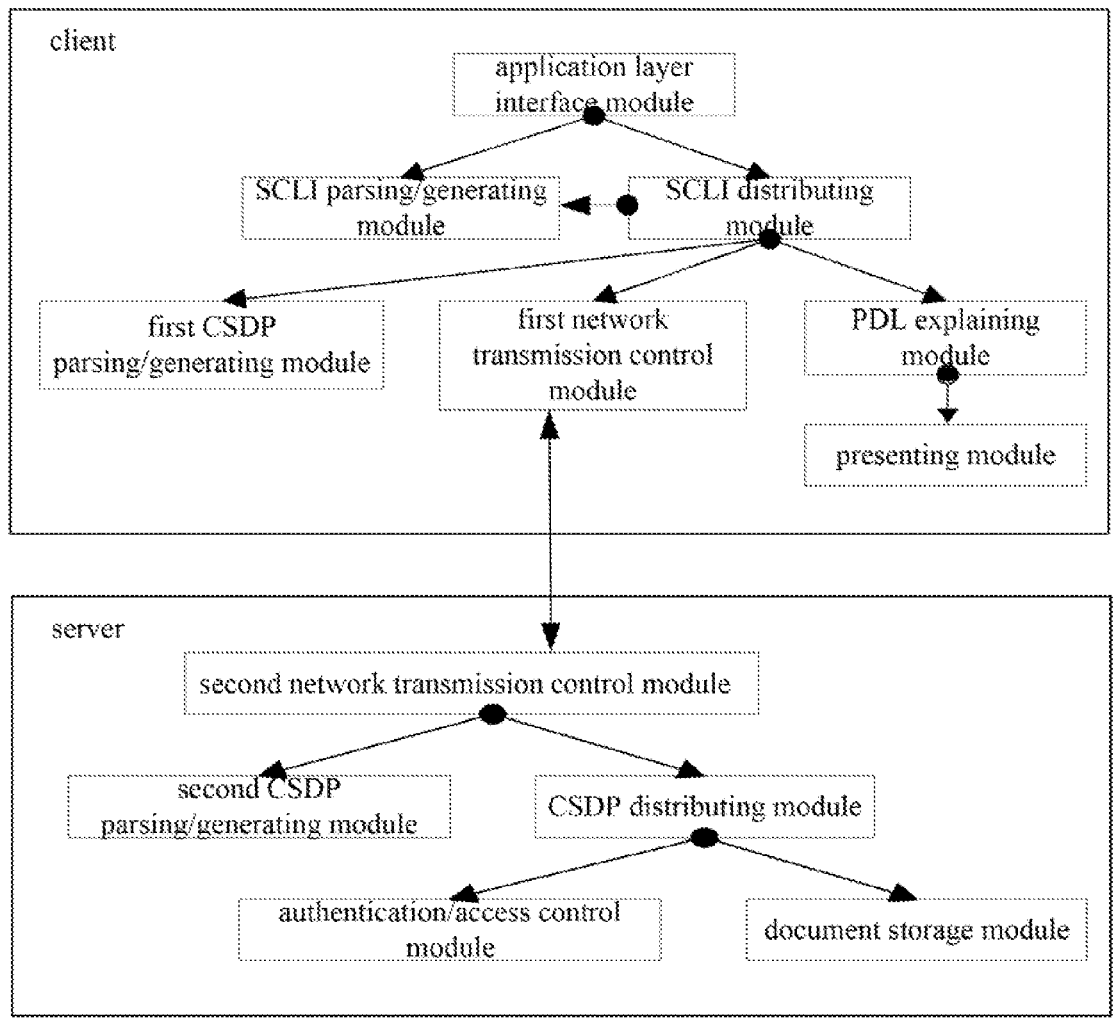
FIG. 3 is a schematic of a structure of a software platform provided by embodiment two of the present invention.

After dividing function modules between the client and the server according to the above function deployment provided by the embodiment of the present invention, a structure of the software platform shown in FIG. 3 can be obtained. As shown in FIG. 3, the client includes an application layer interface module, an SCLI parsing/generating module, an SCLI distributing module, a PDL explaining module, a presenting module, a first Client/Server Docbase Protocol (CSDP) parsing/generating module, and a first network transmission control module;

the server includes an authentication/access control module, a storage module, a second network transmission control module, a second CSDP parsing/generating module, and a CSDP distributing module.

The application layer interface module, the SCLI parsing/generating module, the PDL translation module and the presenting module in the client, as well as the authentication/access control module and the storage module in the server assume the same functions with their counterparts in the software platform shown in FIG. 2, and will not be repeated herein. Compared with the software platform shown in FIG. 2, the software platform shown in FIG. 3 further includes the first CSDP parsing/generating module and the first network transmission control module in the client, and the second network transmission control module, the second CSDP parsing/generating module and the CSDP distributing module in the server, and the SCLI distributing module shown in FIG. 2 is improved. Specifically, in the software platform shown in FIG. 3, improvement of the following modules is described further below.

The SCLI distributing module is configured to call a proper function module or the first CSDP parsing/generating module in the client to generate a CSDP protocol package corresponding to a result of parsing the SCLI protocol package by the SCLI parsing/generating module, and call the first network transmission control module to send the CSDP protocol package to the server; send a CSDP protocol package which is returned by the server to the first network transmission control module to the first CSDP parsing/generating module for parsing, obtain a result of parsing the CSDP protocol package, call the SCLI parsing/generating module to encapsulate the result of parsing the CSDP protocol package into an SCLI protocol package, and return the SCLI protocol package to the application layer Interface module.

The first CSDP parsing/generating module is configured to provide functions of parsing or generating a CSDP protocol package when called by the SCLI distributing module. With respect to the software platform under the C/S mode, the client and the server will communicate with each other using a certain protocol. The CSDP refers to a communication protocol between the client and the server.

The first network transmission control module is configured to send the CSDP protocol package to the second network transmission control module in the server when called by the SCLI distributing module, and receive a CSDP protocol package from the second network transmission control module in the server and send the received CSDP protocol package to the SCLI distributing module.

The second network transmission control module is configured to receive the CSDP protocol package from the first network transmission control module in the client, call the second CSDP parsing/generating module to parse the received CSDP protocol package, and send a result of parsing the CSDP protocol package to the CSDP distributing module; send an execution result returned by the CSDP distributing module to the second CSDP parsing/generating module to generate a CSDP protocol package, and return the generated CSDP protocol package to the first network transmission control module in the client.

The second CSDP parsing/generating module is configured to provide functions of parsing or generating a CSDP package when called by the second network transmission control module.

The CSDP distributing module is configured to call a function module in the server corresponding to the result of parsing the CSDP protocol package from the second network transmission control module, and return an execution result from the called function module to the second network transmission control module.

As can be seen from the above embodiment, the function loads are reasonably distributed and the function modules are also reasonably deployed between the client and the server for the software platform of the embodiment of the present invention, and the software platform in the C/S mode can thus operate properly and the working efficiency is thereby improved. Meanwhile, because this embodiment extends the software platform which was applicable only to a single machine to be one that is applicable to a network, it provides foundation and convenience for development of other applications for the software platform applicable to a network.

Corresponding to the above software platform in the C/S mode, a method for processing unstructured data is provided in an embodiment of the present invention. The method may include the following procedure.

A client receives a predefined command of processing unstructured data from an application software, calls a function in the client and/or in a server which is corresponding to the predefined command through network communications with the server to carry out the operation; and the server provides the function when called by the client;

wherein the predefined command is independent from the storage form of the unstructured data.

The predefined command is a command defined in advance for operating an instance of a predefined model; and the predefined command will trigger a physical operation on the unstructured data.

In the method for processing unstructured data in this embodiment, dividing the functions between the client and the server is also based on the same consideration, with that considered when the software platform in the C/S mode is constructed, i.e., the unstructured data storing function and the authentication function are implemented by the server and can be called by the client; the presenting function may be implemented by the client, and the access control function may be implemented either by the server or by the client. Further more, the client may also support the UOML standard.

The process of calling a function in the server to carry out an operation may include: the server stores the unstructured data and carry outs a reading and/or writing operation on the unstructured data which may include stream media data and/or document data.

The process of calling a function in the client to carry out an operation may include: the client presents the unstructured data such as rendering, displaying, printing and playing.

In the above method, before the function corresponding to the command of operating the unstructured data from the application software is called to carry out the operation, a Challenge/Response process may be adopted to determine whether the application software has private key of a role. Specifically, the method may further include the following steps:

the client sends a login request including a name of a role to the server;

the server generates a random number according to the login request and sends the random number to the client;

the client signs the random number using a private key of the role and sends the signed random number to the server;

the server checks whether the signature of the signed random number is correct using a public key of the role and notifies the client that the login authentication is passed if the signature is correct.

Before the server provides the function when called by the client, the method may further include: the server checks whether the role currently logging in has a privilege of calling the function, and refuses to provide the function if the role does not have the privilege of calling the function.

Before the client provides the function according to the command from the application software, the method may further include: the client cheeks whether the role currently logging in has the privilege of using the function, and refuses to provide the function if the role does not have the privilege of using the function.

The network communications between the client and the server may be performed based on the TCP, the HTTP, the UDP or the FTP.

In addition, the client and the server may encrypt the network communications between them. The encryption may use a symmetric key Furthermore, the method may include; after encrypting the network communications by using the symmetric key, the client and the server send the symmetric key to each other using an asymmetric key. The above symmetric and asymmetric keys may be randomly generated during each network communication between the server and the client.

Based on the above main principle of the present invention, the software platform of an embodiment of the present invention may include one or two or more clients. For example, an embodiment of the present invention provides a software platform including two clients and a server. In the software platform, a first client of the two clients is configured to receive a first sequence of predefined commands from a first application software, and create unstructured data in the server according to the first sequence of predefined commands;

a second client of the two clients is configured to receive a second sequence of predefined commands from a second application software; and provide, according to the second sequence of predefined commands, the second application software with data which is needed by the second application software in the unstructured data created by the first client in the server;

the server is configured to store the unstructured data, communicate with the two clients over a network and provide a function when called by the two clients;

wherein the predefined command is independent from the storage form of the unstructured data.

An embodiment of the present invention provides a method for processing unstructured data in accordance with the above software platform. The method includes the following steps:

the first client receives a first sequence of predefined commands from a first application software, and creates unstructured data in the server according to the first sequence of predefined commands;

the second client receives a second sequence of predefined commands from a second application software; and provides, according to the second sequence of predefined commands, the second application software with data which is needed by the second application software in the unstructured data created by the first client in the server;

the server stores the unstructured data, and provides a function when called by the first client and the second client.

Detailed implementation of each module and detailed procedure of each module cooperating with each other to perform a function will be hereinafter described in detail hi the following description, the presenting function of the client is described by taking rendering as an example.

1, Network transmission control module

The following descriptions of basic functions of the network transmission control module, when not specially stated, are applicable to both the first network, transmission control module in the client, and the second network transmission control module in the server of FIG. 3.

The network transmission control, module is mainly configured to implement functions including connecting and disconnecting a network connection between the server and the client, data transmission and link encryption between the client and the server, and so on. The network transmission control module may be implemented based on a conventional connection-oriented network protocol, such as the TCP, the HTTP, or the FTP; or, may be realized, based on a. conventional packet-oriented network protocol, such as the UDP or the Internet Protocol (IP), and etc. The network transmission control module may also be easily transplanted into other connection-oriented or packet-oriented network, protocol-based environments.

With respect to a specific network protocol, there always exists an available Software Development Kit (SDK). Therefore, the client or the server may adopt a proper SDK to implement network communications with each other. In the following description, the SDK is referred to as a network protocol supporting base.

Preferably, the network transmission control module may provide a connection-oriented interface. For different network protocols, there are two manners for implementing the connection-oriented interface;

1) it is relatively easy to implement a connection-oriented interface in a connection-oriented network protocol; specifically, an interface may be called directly from a network protocol supporting base corresponding to the interface to carry out the connecting or disconnecting of the network connection and the data transmission via the network connection, while only the link encryption function need be developed individually;

2) when a connection-oriented interlace is implemented in a packet-oriented network protocol, a connection-oriented protocol should be firstly implemented based on the packet-oriented network protocol, and then the connection-oriented interface is implemented based on the connection-oriented protocol. The basic method for implementing the connection-oriented Interface in a packet-oriented network protocol is commonly-known. Taking the TCP and IP as an example, the IP is a packet-oriented protocol and the TCP is a connection-oriented protocol implemented based on the IP. Therefore, the implementation may adopt the manner of implementing TCP/IP by BSD. And the SDK of this manner for implementing the connection-oriented protocol is also referred to as a network protocol supporting base.

Examples for implementing the interface of the network transmission control module are described hereinafter:

①  establishing a network connection of the client:

Parameters: IP, port of the server

Return value: Successful or not, a connection handle

Implementation: Directly call an interface provided by the network protocol supporting base.

② establishing a network connection of the server;

Implementation: Call a monitoring interface of the network protocol supporting base, call an interface for setting up a connection in the network protocol supporting base when receiving a connection request from the client, and set up a network connection with the client.

③ disconnecting a network connection:

Implementation: Call an interface for disconnecting a connection in the network protocol supporting base.

④ data transmission:

Implementation: Call an interface for data transmission in. the network protocol supporting base.

⑤ link encryption

There are the following two situations for activating the link encryption:

A, for a network protocol in which link encryption has been embedded, the link encryption function in the network protocol can be used directly;

B, for a network protocol in which link encryption has not been embedded, the link encryption function should be newly developed; the method for implementing the link encryption function is commonly-known, which is described in the following example but is not limited to the example;

a) the client determines an encrypting manner using a public key/symmetric key supported by both the client and the server by querying the server or by following an pre-set agreement with the server; supposing this example uses the public key encryption manner;

b) the client obtains a public key of the server;

c) the client generates a random symmetric key, encrypts the symmetric key using the public key of the server, and then sends the cipher text to the server;

d) the server decrypts the cipher text by using a private key and obtains the symmetric key;

e) during subsequent data exchanging process, the client and the server uses the symmetric key obtained in the above steps for encrypting data exchanged.

In the above steps b, c and d, the client and the server may exchange their roles.

The process of terminating the link encryption may include: the server or the client sends a command of terminating the link encryption to the other party to terminate the link encryption, and does not encrypt data in subsequent data exchanging.

In addition, the link encryption may be implemented as an independent function or may be directly implemented in the interface for establishing a connection, or may be implemented by adopting both manners. For the link encryption implemented as an independent function, two interfaces are needed, for activating the link encryption and for terminating the link encryption respectively. For the link encryption implemented in the interface for establishing a connection, the process of activating the link encryption may be performed after the network protocol supporting base is called to establish the network connection.

2, CSDP parsing/generating module

The following descriptions of basic functions of the CSDP parsing/generating module, without specially stated, are applicable to both the first CSDP parsing/generating module in the client and the second CSDP parsing/generating module in the server in FIG. 3.

The CSDP is a communication protocol based on which the client arid the server communicate with each other, which semantic-ally defines primitives used in the communications between the client and the server in the software platform of the present invention. The CSDP includes several commands, and the client and the server communicate with each other by using these commands. Each command may have parameters, and the party processing the commands may provide a return value for the party sending the commands. The CSDP provided in the present invention is independent from the network protocol and is a semantic layer protocol defined within the software platform.

Semantic, grammar and descriptions of the CSDP are described in the following example, but are not limited to the following example.

a) Grammar

The grammar is similar with that used for calling a process, and each command of the CSDP has similar structure, for example:

a command header includes a name of a command and the number of parameters;

a command body includes one or more parameters; and each parameter includes the three parts of a name, a type and a value of the parameter;

the command may have one or more return values, and each return value has a similar structure with that of a parameter.

b) Semantic

The semantic involved in the CSDP may vary with different functions distributed to the client and the server. Generally, the CSDP only relates to the semantic that the server is involved, such as the storage, organization and management of unstructured data, and the authentication. The access control may also belong to the semantic of the CSDP.

Some commands of the CSDP may rely upon other commands appearing prior to theses commands. In this case, the protocol has a sequence for the commands.

According to the semantic, possible commands in the protocols may include: login, logout, creating a user, deleting a user, listing contents of an unstructured document set, getting an unstructured document, uploading an unstructured document, adding an unstructured document set, deleting an unstructured document set, adding an unstructured document, deleting an unstructured document, getting a privilege, setting up a privilege, authorization, depriving authorization, etc, c) Form of description The descriptions of the CSDP may be in a binary system form, a text form, or an XML form, etc.

Based on the above described semantic, grammar and descriptions of the CSDP, an example of the CSDP is hereinafter given and may serve as reference when a specific CSDP is defined according to practical requirements in practice.

In the following description, two commands are separated by the symbol of ">>>>>>", parameters and return value of each command are separated by the symbol of "------ ", and when defining each command, the semantic is first provided, then the name, and then the name and type of each parameter, and finally the name and type of each return value.

>>>>>>>>>>>>>>>>>>>>>>>>>>>>>>>>>>>>>>>>>>>
set up a session

Command name    SetupSession

----------------------

```
success bool       //whether a session is set up successfully
session_no int     // session number
>>>>>>>>>>>>>>>>>>>>>>>>>>>>>>>>>>>>>>>>>>>
delete a session
Command name    CleanSession
session_no int    // session number
---------------------
success bool       //whether a session is successfully deleted
>>>>>>>>>>>>>>>>>>>>>>>>>>>>>>>>>>>>>>>>>>>
open a docbase
Command name    docbase_open
---------------------
success bool                //whether the docbase is successfully opened
id int64                    // docbase id
root_id int64               // id of root unstructured docbase set
root_name string            //name of root unstructured docbase set
>>>>>>>>>>>>>>>>>>>>>>>>>>>>>>>>>>>>>>>>>>>
initialize a docbase
Command name    docbase_init
---------------------
success bool                //whether a docbase is successfully initialized
id                          // docbase id
admin_id int64              // id of a docbase administrator role
admin_name string           // name of docbase administrator role
admin_prvkey bin            // private key of docbase administrator role
root_id int64 //root dir id // ID of root unstructured docbase set
root_name string            // name of root unstructured docbase set
>>>>>>>>>>>>>>>>>>>>>>>>>>>>>>>>>>>>>>>>>>>
Role login (challenge stage)
Command name    role_login
---------------------
success bool                // successful or not
seed bin                    // value of a random seed
>>>>>>>>>>>>>>>>>>>>>>>>>>>>>>>>>>>>>>>>>>>
Role login (response stage)
Command name    role_login
role_name string            // role name
role_sign bin               // signature of the value of the above random seed using a
                            private key of the role
---------------------
success bool                // whether the login is successfully or not
role_id int64               // id of the role
>>>>>>>>>>>>>>>>>>>>>>>>>>>>>>>>>>>>>>>>>>>
Role logout
Command name    role_logout
role_id int64               // id of a role
---------------------
success bool                //successful or not
>>>>>>>>>>>>>>>>>>>>>>>>>>>>>>>>>>>>>>>>>>>
create an unstructured document set
Command name    doclist_add
parent_id int64             // ID of a parent unstructured document set
name string                 // name of the parent unstructured document set to be
                            established
---------------------
success bool                //successful or not
id int64                    // ID of the newly-created unstructured document set
>>>>>>>>>>>>>>>>>>>>>>>>>>>>>>>>>>>>>>>>>>>
list all unstructured document subsets of an unstructured document set
Command name    doclist_listsub
id int64                    // ID of the unstructured document set
---------------------
success bool                // successful or not
sub_count int               //the number of unstructured document subsets
//the following two return values will circularly appear for sub_count times and represent all
unstructured document subsets
    {
      id int64              // ID of an unstructured document subset
      name string           //name of the unstructured document subset
    }
>>>>>>>>>>>>>>>>>>>>>>>>>>>>>>>>>>>>>>>>>>>
  list all unstructured documents of an unstructured document set
Command name    doclist_listdoc
id int64                    //ID of the unstructured document set
---------------------
success bool                //successful or not
doc_count int               // the number of unstructured documents
  // the following two return values will circularly appear for doc_count times and represent all
sub unstructured documents
```

```
{
    id int64              // id of an unstructured document
    name string           // name of the unstructured document
}
>>>>>>>>>>>>>>>>>>>>>>>>>>>>>>>>>>>>>>>>>>>
delete an unstructured document set
Command name    doclist_delsub
id int64                // ID of the unstructured document set
----------------------
success bool            // successful or not
>>>>>>>>>>>>>>>>>>>>>>>>>>>>>>>>>>>>>>>>>>>
delete an unstructured document
Command name    doclist_deldoc
id int64                // ID of an unstructured document
----------------------
success bool            // successful or not
>>>>>>>>>>>>>>>>>>>>>>>>>>>>>>>>>>>>>>>>>>>
re-name an unstructured document set
Command name    doclist_rename
id int64                // ID of the unstructured document set
name string             //new name of the unstructured document set
----------------------
success bool            // successful or not
>>>>>>>>>>>>>>>>>>>>>>>>>>>>>>>>>>>>>>>>>>>
create an unstructured document
Command name    doclist_adddoc
  id int64              // ID of the unstructured document set where the unstructured
                        document is created
name string             // name of the unstructured document
  gdata bin             // global data of the newly-added unstructured document, optional
----------------------
success bool            // successful or not
id int64                // ID of the unstructured document
>>>>>>>>>>>>>>>>>>>>>>>>>>>>>>>>>>>>>>>>>>>>
get global data of an unstructured document
Command name    doc_get_gdata
id int64                // ID of the unstructured document
----------------------
success bool            //successful or not
gdata bin               // global data of the unstructured document
>>>>>>>>>>>>>>>>>>>>>>>>>>>>>>>>>>>>>>>>>>>>>
upload global data of an unstructured document
Command name    doc_up_gdata
id int64                // ID of the unstructured document
gdata bin               // global data of the unstructured document
----------------------
success bool            //successful or not
>>>>>>>>>>>>>>>>>>>>>>>>>>>>>>>>>>>>>>>>>>>>>
upload page data of an unstructured document
Command name    doc_up_pdata
id int64                // ID of the unstructured document
index int               // page index
pdata bin               //page data
----------------------
success bool            //successful or not
>>>>>>>>>>>>>>>>>>>>>>>>>>>>>>>>>>>>>>>>>>>>>>
get the total number of pages
Command name    doc_get_page_count
id int64                // ID of an unstructured document
----------------------
success bool            //successful or not
count int               //the number of pages in the unstructured document
>>>>>>>>>>>>>>>>>>>>>>>>>>>>>>>>>>>>>>>>>>>>>>
delete a designated page
Command name doc_del_page
id int64                //ID of an unstructured document
index int               //page index
----------------------
success bool            //successful or not
>>>>>>>>>>>>>>>>>>>>>>>>>>>>>>>>>>>>>>>>>>>>>>
get data of a designated page
Command name    doc_del_page
id int64                //ID of an unstructured document
index int               //page index
----------------------
success bool            //successful or not
pdata bin               //page data
>>>>>>>>>>>>>>>>>>>>>>>>>>>>>>>>>>>>>>>>>>>>>>
inserting one page into an unstructured document
```

```
Command name       doc_ins_page
id int64                   // ID of an unstructured document
index int                  //new page index
pdata bin                  // page data
----------------------
success bool               //successful or not
>>>>>>>>>>>>>>>>>>>>>>>>>>>>>>>>>>>>>>>>>>>>>>>>
move an unstructured document to a designated unstructured document set
Command name    doc_move
id int64                   // ID of the unstructured document
sid int64                  // ID of the source unstructured document set
tid int64                  // ID of the target unstructured document set
----------------------
success bool               //successful or not
>>>>>>>>>>>>>>>>>>>>>>>>>>>>>>>>>>>>>>>>>>>>>>>>
copy an unstructured document to a designated unstructured document set
Command name    doc_copy
id int64                   // ID of the unstructured document
sid int64                  // ID of the source unstructured document set
tid int64                  // ID of the target unstructured document set
----------------------
success pool               //successful or not
>>>>>>>>>>>>>>>>>>>>>>>>>>>>>>>>>>>>>>>>>>>>>>>>
  get a privilege of a designated subject over designated object
  Command name    getpriv
oid int64                  // ID of the object
sid int64                  // ID of the subject (role)
----------------------
success bool               //successful or not
priv int                   // privilege word
>>>>>>>>>>>>>>>>>>>>>>>>>>>>>>>>>>>>>>>>>>>>>>>>
get ACL of a designated object
Command name    getobjpriv
oid int64                  // ID of the object
----------------------
Success bool               //successful or not
entry_count int            //the number of privilege entries
//the following two return values will be circularly repeated for entry_count times, which
indicate all privilege entries in the ACL of the object
    {
      id int64             // ID of the subject (role)
      priv int             // privilege word
    }
>>>>>>>>>>>>>>>>>>>>>>>>>>>>>>>>>>>>>>>>>>>>>>>>
set ACL of an object
Command name    setobjpriv
oid int64                  // ID of the object
entry_count int            //the number of privilege entries in ACL
//the following two parameters will be circularly repeated for entry_count times, which
indicate privilege entries which should be modified in the ACL
    {
      id int64             //   ID of the subject (role)
      priv int             // privilege word
    }
----------------------
success bool               //successful or not
>>>>>>>>>>>>>>>>>>>>>>>>>>>>>>>>>>>>>>>>>>>>>>>>
create a role
Command name      role_Creat
name string                // name of the role
----------------------
success bool               //successful or not
id int64                   // ID of the role
prv_key bin                // private key of the role
>>>>>>>>>>>>>>>>>>>>>>>>>>>>>>>>>>>>>>>>>>>>>>>>>
delete a role
Command name    role_del
id int64                   //role ID
----------------------
success pool               //successful or not
>>>>>>>>>>>>>>>>>>>>>>>>>>>>>>>>>>>>>>>>>>>>>>>>
update the private key of a role
Command name    role_update
id int64                   // ID of the role
----------------------
success bool               //successful or not
prv_key bin                // new private key of the role
>>>>>>>>>>>>>>>>>>>>>>>>>>>>>>>>>>>>>>>>>>>>>>>>
enumerate all the roles
```

```
    Command name  role_enum
    ---------------------
    success bool            //successful or not
    role_count int          //the number of roles
    //the following two return values will be circularly repeated for role_count times, which
indicate all roles
    {
       id int64             // ID of a role
       name string          // name of the role
    }
    >>>>>>>>>>>>>>>>>>>>>>>>>>>>>>>>>>>>>>>>>>>>>>>>>>>>
    get the number of source files in an unstructured document
    Command name   doc_get_src_count
    id int64                // ID of the unstructured document
    ---------------------
    success bool            //successful or not
    src_count int             //the number of source files
    >>>>>>>>>>>>>>>>>>>>>>>>>>>>>>>>>>>>>>>>>>>>>>>>>>>>
    update source file data/ append a new source file
    Command name   doc_append_src
    id int64                // ID of an unstructured document
    index int               // source file index, optional (if no index is provided, a source
file is newly created)
    offset int              // update designated source file starting from offset
    psrc bin                // source file data
    ---------------------
    success bool            //successful or not
    >>>>>>>>>>>>>>>>>>>>>>>>>>>>>>>>>>>>>>>>>>>>>>>>>>>>
    get the length of a designated source file
    Command name doc_get_src_len
    id int64                // ID of an unstructured document
    index int               // source file index
    --------------------------
    success bool            //successful or not
    src_len int             // the length of the source file
    >>>>>>>>>>>>>>>>>>>>>>>>>>>>>>>>>>>>>>>>>>>>>>>>>>>>
    //get data of a designated source file
    Command name doc_get_src
    id int64                // ID of an unstructured document.
    index int               // source file index
    offset int              //read data of the source file starting from the offset
    len int                 // get length limitation of source file data
    ---------------------
    success bool            //successful or not
    psrc bin                // data of source file
    >>>>>>>>>>>>>>>>>>>>>>>>>>>>>>>>>>>>>>>>>>>>>>>>>>>>
```

The function of the CSDP parsing/generating module is to parse a CSDP protocol package to obtain data in the CSDP protocol package, or generate a CSDP protocol package according to data provided. An exemplary interface instance of the CSDP parsing/generating module is described hereinafter, which may serve as reference when an interface of the CSDP parsing/generating module is defined according to practical application requirements in practice.

struct cmd;
    cmd*cmd_create( );
    void cmd_destroy(cmd*);
    int    cmd_unmarshal(cmd*,    const    unsigned char*csdp_cmd, int len);
    int cmd_marshal(cmd*,unsigned char*buf, int buf_len);
    const char*cmd_get_name(cmd*);
    int cmd_get_param_count(cmd*);
    const char*cmd_get_param_name(cmd*, int index);
    char cmd_get_param_type(cmd*, int index);
    int cmd_get_param_len(cmd*, int index);
    const unsigned char*cmd_get_param(cmd*, int index);
    void cmd_set_name(cmd*, const char*name);
    void cmd_add_param(cmd*, const char*name, char type, unsigned char*param, int param_len);

The above is definition of an interface of the CSDP parsing/ generating module, and the CSDP parsing/generating module may also be called CSDP parser/generator.

The cmd structure defines the CSDP parser/generator;

the cmd_create and cmd_destroy are respectively for creating and destroying the CSDP parser/generator;

the cmd unmarshal is for parsing a CSDP protocol package into the cmd structure, and in practice data parsing is implemented the cmd_unmarshal interface;

the cmd_unmarshal is for encapsulating the cmd structure into the CSDP protocol package, and in practice, cmd_marshal interface is used for generating the CSDP protocol package;

the cmd_set_name and cmd_add_param are respectively for setting a name for a protocol command and add a parameter for the protocol command, and mainly for generating the CSDP protocol package;

the cmd_get_name, cmd_get_param_count, cmd_get_param_type, cmd_get_param_len, cmd_get_param and cmd_get_param_name are respectively for getting a name of a protocol command, the number of protocol parameters, the type of a designated protocol parameter, the length of a designated protocol parameter, data of a designated protocol parameter, and the name of a designated protocol parameter. These interfaces am mainly for parsing a CSDP protocol package.

The general procedure of using the above interfaces is as follows.

The process of parsing a CSDP protocol package includes:
getting the CSDP protocol package;
calling the cmd_create to create a cmd structure:
calling the cmd_unmarshal to parse the CSDP protocol package;
calling the cmd_get_*** series to get related information of the protocol package, such as the command name and the data of each parameter and to perform related operations;
calling the cmd_destroy to destroy the cmd structure after operations involving the cmd structure are completed.

The process of generating a CSDP protocol package includes:
calling the cmd_create to create a cmd structure;
calling the cmd_set_name to set a name for the command;
calling the cmd_add_param to add several parameters;
calling the cmd_marshal to generate the CSDP protocol package and perform related operations;
calling the cmd_destroy to destroy the cmd structure after operations involving the cmd structure are completed.

3, Application Layer Interface Module

This module is an interface of the client in the software platform, is for providing the application software with an interface for accessing the docbase. When accessing a function of the docbase, the application software calls the interface of this module, and delivers a protocol package in the form of SCLI, i.e. sends an SCLI command.

The application layer interface module is equivalent to a general control module in the software platform, and generally performs the following procedure after receiving the SCLI command from the application software.

Step 1: the application layer interface module calls the SCLI parsing/generating module to parse the SCLI command to get a parsing result.

Step 2: the application layer interface module calls the SCLI distributing module and delivers the parsing result of the SCLI command to the SCLI distributing module.

Step 3: the SCLI distributing module determines the function requested by the application software according to the parsing result of the SCLI command, calls an appropriate function module and gets an operation result. In this step, the function module which is called may be a function module in the client, or may be a function module in the server. When a function module in the server is involved, the first CSDP parsing/generating module is called to generate the CSDP protocol package, and the first network transmission module is called to send the CSDP protocol package to the server.

Step 4: the SCLI distributing module calls the SCLI parsing/generating module to encapsulate the operation result into the SCLI protocol package.

Step 5: the application layer interface module returns the SCLI protocol package including the operation result to the application software.

The application layer interface module does not need to be implemented, and instead, it is only needed to call a function interlace provided by other modules.

4, SCLI Parsing/Generating Module

The SCLI parsing/generating module includes an SCLI parser and an SCLI generator, and is for parsing or generating a package based on the SCLI interface used by the software platform. Specifically, the SCLI parsing/generating module is for parsing an SCLI protocol package from the application software, returning contents of the SCLI protocol package to the application layer interface module, and further for generating, when called by the SCLI distributing module, an SCLI protocol package which will be returned to the application layer interface module and the application software.

5, SCLI Distributing Module

Input of the SCO distributing module is the parsing result of the SCLI protocol package, and output is the SCLI protocol package encapsulating the operation result of the software platform. Specifically the SCLI distributing module is configured to choose an appropriate C/S function module as well as an appropriate function interface in the chosen module according to the parsing result of the SCLI protocol package; and then call the appropriate function interface and get a return value; and finally, call the SCLI generator to encapsulate the return value into the SCLI protocol package.

Figure 4:
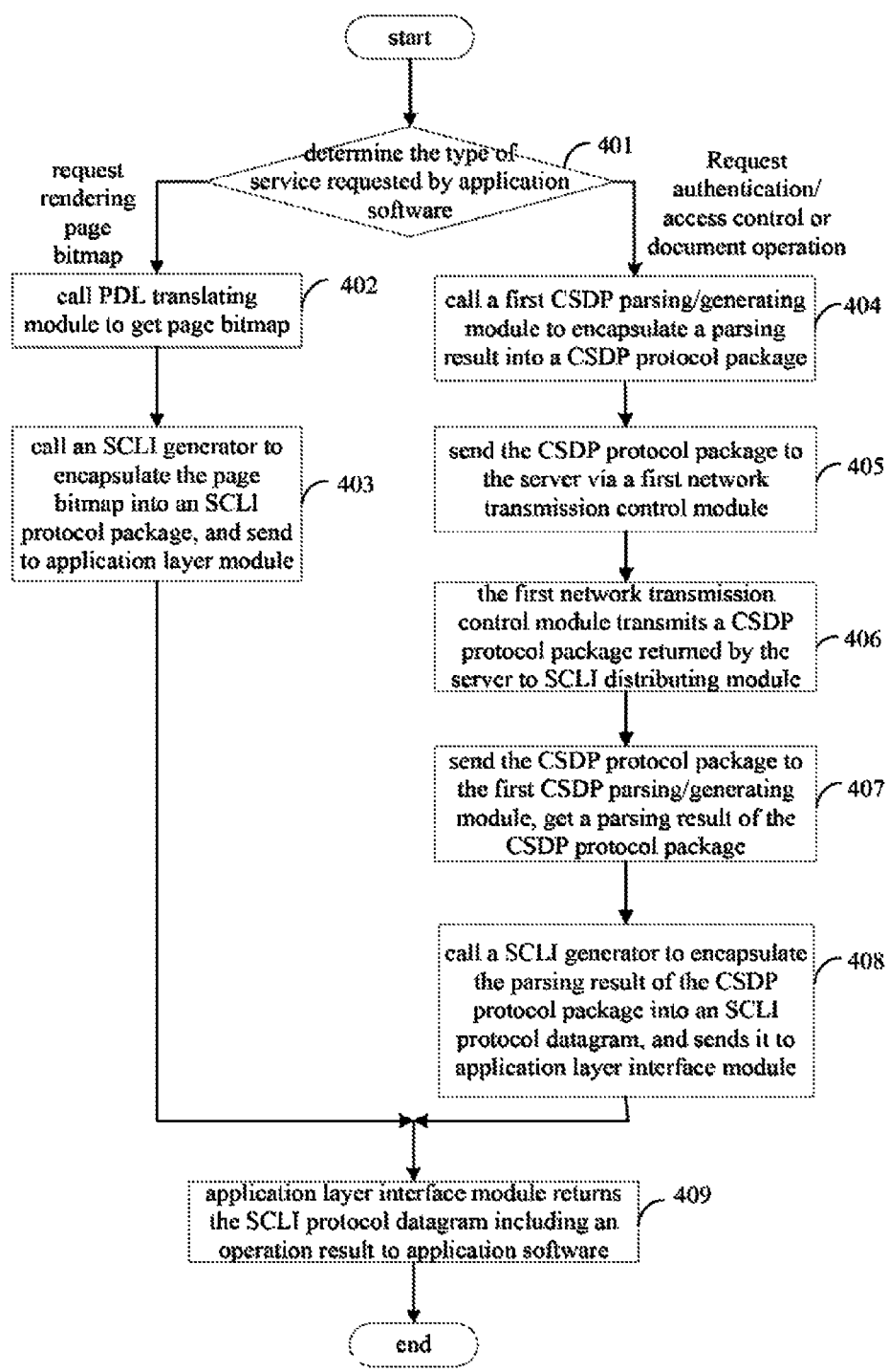
FIG. 4 is a flowchart illustrating a process of choosing a function module by an SCLI distributing module according to an embodiment of the present invention.

The above process of choosing an appropriate function module mainly includes determining a function service requested in the SCLI protocol package sent by the application software. FIG. 4 is a flowchart illustrating a process of choosing a function module by a SCLI distributing module according to an embodiment of the present, invention. Referring to FIG. 4, the process of choosing an appropriate function module includes the following steps.

Step 401: the type of the function service requested by the application software is determined according to the parsing result of the SCLI protocol package; if the application software requests rendering a page bitmap, step 402 is performed; if the application software requests performing authentication or getting access control information or operating an unstructured document/unstructured document set or the like, step 404 is performed.

In this step, it is actually determined whether the function service requested by the application software is deployed at the client or at the server according to the parsing result of the SCLI protocol package. If it is deployed at the client the function module corresponding to the function service is directly called. If it is deployed at the server, it is necessary to call a function module for communicating with the server.

Step 402: the SCLI distributing module distributes the parsing result of the SCLI protocol package to the PDL explaining module.

Step 403: the SCLI distributing module calls the SCLI generator in the SCLI parsing/generating module to encapsulate a page bitmap generated by the PDL translation module into an SCLI protocol package, sends the SCLI protocol package to the application layer interface module, and step 409 is performed.

Step 404: the SCLI distributing module calls the first CSDP parsing/generating module to encapsulate the parsing result into the CSDP protocol package.

Step 405: the SCLI distributing module sends the CSDP protocol package generated in step 404 to the server via the first network transmission control module. Step 406: after processing, the server encapsulates an operation result into the CSDP protocol package and returns it to the first network transmission control module, and the first network transmission control module sends the CSDP protocol package returned from the server to the SCLI distributing module.

Step 407: the SCLI distributing module sends the CSDP protocol package to the first CSDP parsing/generating module for parsing, and obtains a parsing result of the CSDP protocol package.

Step 408: the SCLI distributing module calls the SCLI generator in the SCLI parsing/generating module to generate an SCLI protocol package using the parsing result of the CSDP protocol package, and sends the generated SCLI protocol package to the application layer interface module.

Step 409: the application layer interface module returns the SCLI protocol package including the operation result sent from the SCLI distributing module to the application software.

The above steps 404 and 408 relates to the conversion between the SCLI protocol package and the CSDP protocol package. The conversion process will be described hereinafter 1) converting an SCLI protocol package into a CSDP protocol package is the process of encapsulating the parsing .result in the SCLI protocol package into the CSDP protocol package as in step 404.

Because the CSDP protocol is a group of commands including a limited number of commands, the parsing result in the SCLI protocol package may first be used for finding a matching command in the CSDP protocol so as to determine a CSDP command corresponding to the SCLI protocol package. Some possible manners are provided below, but detailed implementation should not be limited to those manners:

In a first manner, all the commands are checked in turn to find out whether they match the parsing result of the SCLI protocol package, and the first command matching the parsing result of the SCLI protocol package is determined as the CSDP command matching the SCLI protocol package.

In a second manner, a matching degree between each command and the parsing result of the SCLI protocol package is determined in turn, and a command having the highest matching degree is determined as the CSDP command matching the SCLI protocol package.

In a third manner, the category of functions to which the parsing result of the SCLI protocol package belongs is first determined, such as authentication, access control and operation cm an unstructured document/unstructured document set, and then the parsing result of the SCLI protocol package is used for finding out a matching command in a CSDP command subset to which the determined function category relates by using a matching method such as the above first or second manner to obtain the CSDP command matching with the SCLI protocol package.

Then, the CSDP generator in the CSDP parsing/generating module is called according to the parsing result for the SCLI and the determined CSDP command to generate the CSDP protocol 2) converting a CSDP protocol package into an SCLI protocol package is the process of encapsulating the parsing result of the CSDP protocol package into the SCLI protocol package as in step 408.

First, at least one command and at least one parameter included in the CSDP protocol package are determined according to the parsing result in the CSDP protocol package. Generally, the command is not used during the conversion process because parsing the CSDP protocol package by the SCLI distributing module generally generates an operation result returned from the server, i.e., at least one return value of the server, and therefore only the parameter included therein needs to he considered during the conversion process.

Next, each parameter included in the CSDP protocol package is encapsulated into the SCLI protocol package.

The above matching operation is performed by the SCLI distributing module, and specifically, before calling the first CSDP parsing/generating module to generate a CSDP protocol package, the SCLI distributing module searches the commands in the CSDP protocol for a CSDP command matching with the SCLI protocol package using the parsing result of the SCLI protocol package, and calls the CSDP generator in the first CSDP parsing/generating module according to the parsing result of the SCLI protocol package and the determined CSDP command to generate a CSDP protocol package; and before calling the SCLI parsing/generating module to generate a SCLI protocol package, the SCLI distributing module searches the commands in the SCLI protocol for an SCLI command matching with the CSDP protocol package using the parsing result of the CSDP protocol package, and calls the SCLI generator in the SCLI parsing/generating module according to the parsing result in the CSDP protocol package and the determined SCLI command to generate an SCLI protocol package.

6, PDL Translation Module

PDL is a page descriptive language and is configured to define a command format for describing page layout. The PDL translation module is configured to explain a particular type of PDL, and call the rendering module according to a PDL command to generate a bitmap of a page.

Input of the PDL translation module is PDL data describing layout information of a whole page, and output is the bitmap of the page, and the working procedure of the PDL translation module is as follows.

Step 1: each command in the PDL data is traversed.

Step 2: the rendering module is called according to an operation described In the PDL command.

Step 3: the bitmap of the page is generated.

7, Rendering Module

The rendering module is also called a rendering engine, and is a software or hardware module configured to render page layout. Familiar rendering engines include Win32 gdi xwindows, qt cairo, libart, agg, and etc.

8, CSDP Distributing Module

Input of the CSDP distributing module is the parsing result of the CSDP protocol package, and functions thereof include: calling an appropriate module according to a service requested in the CSDP protocol package, getting a return value, calling the CSDP generator in the CSDP parsing/generating module to encapsulate the return value into the CSDP protocol package.

The CSDP distributing module carry outs the following steps:

Step 1: choosing an appropriate function module and a function interface related with the chosen module of the server according to the parsing result of the CSDP protocol package;

Step 2: calling the function interface chosen in step 1 to get a return value;

Step 3: sending the return value to the CSDP parsing/generating module for encapsulation into the CSDP protocol package.

The above process of choosing an appropriate function interface related to the chosen module includes the following steps of:

Step 1: determining the CSDP command and parameters according to the parsing result of the CSDP protocol package;

Step 2: finding out a function module/inter face in the server which matches with the CSDP command and the parameters. There may be multiple matching manners, and a few examples are given below.

According to a first manner, all the modules/interfaces in the server are checked in turn to find out whether they match with the CSDP command, and the first interlace matching with the CSDP command is determined as the module/interface matching with the CSDP command.

According to a second manner, matching degrees between each module/interface in the server and the CSDP command are determined in turn, and a module/interface with the highest matching degree is determined as the module/interface matching with the CSDP command.

According to a third manner, a category of functions to which a service requeted by the CSDP command belongs is firstly determined, and then the matching processing following a matching manner such as the above first or second manner is performed to choose one interface from the interfaces provided by the function module as the interface matching with the CSDP command.

When it is determined whether a certain interface matches with the current CSDP command, it is determine whether the name of the interface is the same with or similar to the name of the CSDP command, whether the number of parameters is the same, and whether the parameter types are the same or convertible, etc.

9, Authentication/Access Control Module

According to the patent application document mentioned in the background of the invention, the authentication of the software platform is based on roles. Each role has two attributes, name and ID, and also has a pair of public and private keys. The private key of the role is managed by the software/user, and the public key of the role is managed by the software platform.

In the software platform of the present invention, one application software can log on the server as multiple roles at the same time.

When a role logs into the server, authentication is necessary. The authentication process in the challenge/response mode includes two stages.

Stage One:

1, the application software sends a login request to the client; the login request includes the name of the role which identifies the identity of the role requesting to login;

2, the client forwards the login request to the server;

3, the server generates a random number according to the login request received from the client, and sends the random number to the client;

4, the client returns the random number to the application software.

Stage Two:

1, the application software signs the random number by using the private key of the role and sends the signed random number to the client;

2, the client sends the signed random number to the server;

3, the server verifies whether the signature is correct by using the public key of the role; if it is correct, the role passes the login authentication; otherwise, the login is refused.

Alternatively, in the challenge/response mode, the random number may also be encrypted by using the public key, and the application software performs decryption using the private key.

When the software platform in the C/S mode performs access control, data describing an access privilege may be stored in the server. In this case, the privilege verification is performed by the server. The detailed process of access control may include the following steps.

Step 1: the application software calls the application layer interface module to send a command which is in form of an SCLI protocol package.

Step 2: the application layer interface module calls the SCLI parser to parse the SCLI protocol package.

Step 3: the application layer interface module calls the SCLI distributor to distribute a parsing result of the SCLI protocol package.

Step 4: if a function module accessed is in the server, the server firstly detects whether the role logging in the client has the privilege for performing the operation on the object in which the request involves before performing a function corresponding to the function module; if the role has the privilege, the server operates according to the request of the client and returns an. operation result; otherwise, the server returns error information.

Alternatively, the data describing the access privilege may be stored in the client. Before providing a function corresponding to a command .from the application software, the client may first detect whether the role logging in the client has the privilege of accessing the function, and then, provides the function if the role has the privilege.

10, Storage Module

In the software platform under the C/S mode in accordance with the present invention, the storage module provides functions such as accessing and operating an unstructured document and/or unstructured document set, and is deployed in the server.

The foregoing describes the deployment, the functions, the interface, the design and the implementation of each function module in the software platform under the C/S mode in accordance with the present invention. Based on the software platform shown, in FIG. 3, implementation of each function by the function modules shown in FIG. 3 cooperating with each other is described hereinafter in detail. Interactions between the client and the server is involved, and functions of the software platform in the C/S mode of the present invention mainly include: initializing a docbase, opening a docbase, closing a docbase, login, logout, getting an ACL (Access Control List), updating an ACL, listing unstructured document sets, listing unstructured documents, creating an unstructured document set, deleting an unstructured document set, updating the name of an unstructured document set, creating an unstructured document, deleting an unstructured document, getting global data of an unstructured document, updating global data of an unstructured document, getting the number of pages in an unstructured document, getting data of a page of an unstructured document, updating the data of a page of an unstructured document, and inserting data of a page into an unstructured document, etc. The detailed description is as follows:

1, Initializing a Docbase:

The process of initializing a docbase includes the following steps.

Step 1: a session is established, and the step includes the following five sub steps:

a) the client calls the first network transmission control module to establish a network connection;

b) the server monitors a request of the client and establishes a network connection with the client;

c) a link encryption function is activated, which may be optional;

d) the client sends a CSDP command to the server for establishing a session;

e) the server sends a CSDP return value to the client and returns a session number, Step 2: the client sends a command of initializing the docbase to the server.

Step 3: the server determines whether the docbase has been initialized; if the docbase has not been initialized, the server initializes the docbase, i.e., creates a root unstructured document set, initializes an administrator role of the docbase, and returns the ID of the docbase, name and ID of the root unstructured document set, name and ID and a private key of the administrator role of the docbase to the client in a CSDP protocol package.

2, Opening a Docbase

Step 1: a session is established;

Step 2: the client sends a CSDP command to the server for opening the docbase;

Step 3: the server determines whether the docbase has been initialized, and returns the ID of the docbase and the name and ID of the root unstructured document set in the form of a CSDP protocol package to the client if the docbase has been Initialized, 3, Closing a Docbase:

The process of closing a docbase mainly includes ending a session, and specifically, the process includes: the client sends a CSDP command of ending a session to the server, and the server processes the CSDP command and deletes data of the session corresponding to the client.

4, Login:

Supposing a session has been established, the login process includes the following steps.

Step 1: the client sends a CSDP command to the server requesting to log in, and login parameters include a role name.

Step 2: the server searches for a role according to the role name; if no role is found, the server returns error information; if the role is found, the server generates and stores a random number in the data of the session corresponding to the client, and sends the random number to the client in form of a CSDP protocol package.

Step 3: the client receives the random number sent by the server, and signs the random number by using a private key of the role; and then sends a CSDP command to the server requesting to log in, and login parameters include a string for signature.

Step 4: the server verifies the signature by using the public key of the role; if the signature passes the verification, login of the role is successful and the server returns the ID of the role to the client.

5, Logout:

The logout process includes the following steps.

Step 1: the client sends a CSDP command to the server requesting role logout and sends the ID of the role at the same time.

Step 2: the server verifies whether the role has logged into the session of the client, and removes the ID of the role from the data of the session corresponding to the client if the role has tossed In the session.

6, Getting an ACL:

ACL refers to all privilege information of an object i.e. a list of privileges of all subjects (i.e. roles) over the object The process of getting an ACL includes the following steps.

Step 1: the client sends a CSDP command to the server requesting the ACL of a designated object.

Step 2: the server checks whether the object exists in the server; if the object exists, the server gets the ACL of the object and then returns the ACL data encapsulated in. a CSDP protocol package, 7, Updating an ACL The process of updating an ACL includes the following steps.

Step 1: the client sends a CSDP command to the server requesting to update the ACL of a designated object, and sends new ACL data as parameters at the same time.

Step 2: the server determines whether the role currently logging in the client has a privilege of updating the object, and updates existing ACL data In the server by using the new ACL data if the role has the privilege.

8, Listing an Unstructured Document Set:

Listing an. unstructured document set refers to presenting a list of all unstructured document subsets of a designated unstructured document set, and the process includes the following steps.

Step 1: the client sends a CSDP command to the server requesting a list of all unstructured document subsets of a designated unstructured document set.

Step 2: the server determines that the unstructured document set. designated by the client exists, enumerates all unstructured document subsets of the designated unstructured document set, and returns names/IDs of all. the unstructured document subsets which can be currently accessed by the client.

9, Listing an Unstructured Document:

The process of listing an unstructured document includes the following steps.

Step 1: the client sends a CSDP command to the server requesting to get all unstructured documents in a designated unstructured document set.

Step 2: the server determines that the unstructured document set designated by the client exists, enumerates all unstructured documents in the designated unstructured document set, and returns names/IDs of all the unstructured documents which can be accessed by the client.

10, Creating an Unstructured Document Set:

The process of creating an unstructured document set includes the following steps.

Step 1: the client sends a CSDP command to the server requesting to create a new unstructured document subset in a designated unstructured document set, and sends the name of the new unstructured document subset at the same time.

Step 2: the server determines that the designated unstructured document set exists, and also determines that the client has the privilege of creating a new unstructured document subset in the designated unstructured document set and that the designated unstructured document set does not include an unstructured document subset having the same name with the new unstructured document subset; then, the server creates the new unstructured document subset with the designated name, and returns the ID of the new unstructured document subset.

11, Deleting an Unstructured Document Set:

The process of deleting an unstructured document set includes the following steps.

Step 1: the client sends a CSDP command to the server requesting to delete a designated unstructured document set.

Steps 2-5 below are a recursion process.

Step 2: the server determines that the designated unstructured document set exists, and sets the designated unstructured document set as a current unstructured document set.

Step 3: it is determined whether the client has a privilege of deleting the current unstructured document set, and the former step is performed again if the client does not have the privilege.

Step 4: all unstructured documents in the current unstructured document set are deleted if the client has the privilege of deleting the current unstructured document set.

Step 5: the above steps 2-4 are performed for all unstructured document subsets in the current unstructured document set.

12, Updating the Name of an Unstructured Document Set:

The process of updating the name of an unstructured document set includes the following steps.

Step 1: the client sends a CSDP command to the server requesting to update the name of a designated unstructured document set.

Step 2: the server determines that the client has a privilege of modifying the designated unstructured document set, and then updates the name of the designated unstructured document set.

13, Creating an Unstructured Document:

The process of creating an unstructured document includes the following steps.

Step 1: the client sends a CSDP command to the server requesting to create a new unstructured document in a designated unstructured document set and provides the name of the new unstructured document.

Step 2: the server determines that the designated unstructured document set exists and also determines that the client has a privilege of creating a new unstructured document in the designated unstructured document set.

Step 3: the server determines that the designated unstructured document set does not include an unstructured document with the same name with the name of the new unstructured document, and then creates the new unstructured document with the designated name, and returns the ID of the new unstructured document.

14, Deleting an Unstructured Document:

The process of deleting the unstructured document includes the following steps.

Step 1: the client sends a CSDP command to the server requesting to delete a designated unstructured document.

Step 2: the server determines that the designated unstructured document exists and also determines that the client has a privilege of deleting the designated unstructured document.

Step 3: the server deletes the designated unstructured document,

15, Getting Global Data of an Unstructured Document:

The process of getting global data of an unstructured document includes the following steps.

Step 1: the client sends a CSDP command to the server requesting to get the global data of a designated unstructured document.

Step 2: the server determines that the designated unstructured document exists and also determines that the client has a privilege of accessing the designated unstructured document.

Step 3: the server encapsulates the global data of the unstructured document into a CSDP protocol package and returns the CSDP protocol package to the client, 16, Updating Global Data of an Unstructured Document:

The process of updating global data of an unstructured document includes the following steps.

Step 1: the client sends a CSDP command to the server requesting to update global data of a designated unstructured document, and meanwhile sends new global data for updating as parameters.

Step 2: the server determines that the designated unstructured document exists and also determines that the client has a privilege of updating the designated unstructured document.

Step 3: the server updates existing global data of the designated unstructured document by using the new global data sent by the client.

17, Getting the Number of Pages of an Unstructured Document:

The process of getting the number of pages of an unstructured document includes the following steps.

Step 1: the client sends a CSDP command to the server requesting to get the number of pages of a designated unstructured document.

Step 2: the server determines that the designated unstructured document exists and also determines that the client has a privilege of accessing the designated unstructured document.

Step 3: the server gets the number of pages of the designated unstructured document, returns the number of pages of the designated unstructured document which is encapsulated by the CSDP protocol to the client.

18, Getting Data of a Page of an Unstructured Document:

The process of getting the data of a page of an unstructured document includes the following steps.

Step 1: the client sends a CSDP command to the server requesting to get data of a page in a designated unstructured document.

Step 2: the server determines that the designated unstructured document exists, and also determines that the client has a privilege of accessing the designated unstructured document and that the page requested exists.

Step 3: the server gets the data of the requested page of the designated unstructured document, returns the data of the requested page which is encapsulated using the CSDP protocol to the client, 19, Updating Data of a Page of an Unstructured Document:

The process of updating the data of a page of an unstructured document Includes the following steps.

Step 1: the client sends a CSDP command to the server requesting to update the data of a certain page in a designated unstructured document, and meanwhile sends data of the new page as a parameter.

Step 2: the server determines that the designated unstructured document exists, and also determines that the client has a privilege of updating the designated unstructured document and that the page requested exists.

Step 3: the server updates the data of the requested page of the designated unstructured document using the data of the new page sent by the client.

20, Inserting Data of a Page of an Unstructured Document:

The process of inserting data of a page of an unstructured document includes the following steps.

Step 1: the client sends a CSDP command to the server requesting to insert a new page into a designated unstructured document, and meanwhile sends data and position of the new page as parameters.

Step 2: the server determines that the designated unstructured document exists, and also determines that the client has a privilege of updating the designated unstructured document and that the position where the page is to be inserted is reasonable.

Step 3: the server inserts the new page data sent by the client at the position in the designated unstructured document.

In the present invention, it is not to restrictly differentiate the words of "parsing", "explaining" and "translation", those skilled in the art can understand that they may have the same or similar meaning in some environments, or they may include common steps in some environments.

Those skilled in the art can understand that the technical solution in the present invention may be implemented by computer software. The "software platform" described in the above embodiments of the present invention may be a type of "software platform". The computer software implementing the technical solution of the present invention may he stored in varieties of storage media.

The foregoing is only embodiments of the present invention. The protection scope of the present invention, however, is not limited to the above description. Any change or substitution, easily occurring to those skilled in the art, should be covered by the protection scope of the present invention.

The invention claimed is:

1. A software platform for processing restructured data, comprising a server and a client; wherein the client is configured to receive a predefined command from an application software, call a function, which is corresponding to the predefined command and which is in the client and/or in the server through network communications with the server to carry out an operation; and the server is configured to perform network communications with the client and provide the function when called by the client; wherein the predefined command is independent from a storage form of the unstructured data and describes an operation on an instance of an abstract model; wherein the abstract model is obtained by abstracting presence effect of a certain type of unstructured documents; and describes an operation on an instance of an abstract model; wherein the abstract model is obtained by abstracting presence effect of a certain type of unstructured documents;

wherein the operation on an instance of an abstract model is mapped onto a physical operation on the storage data containing Page Description Language (PDL).

2. The software platform of claim 1, wherein the predefined command is a command defined in advance for operating an instance of the abstract model a predefined model, and the predefined command initiates a physical operation on the unstructured data.

3. The software platform of claim 1, wherein, a series of commands are sent to the software platform, that processes the unstructured data to create unstructured data corresponding to any designated presence effect, wherein the unstructured data created have the same or similar presence effect.

4. The software platform of claim 1, wherein the client is configured to send a login request to the server; and the server is configured to authenticate the client according to the login request received from the client.

5. The software platform of claim 4, wherein, a challenge/response mode is adopted during role login to verify whether the application software holds a role private key.

6. The software platform of claim 1, wherein the server is further configured to check whether a role currently logging in has a privilege over a function before providing the function when called by the client, and refuse to provide the function if the role does not have the privilege.

7. The software platform of claim 1, wherein the client is further configured to check whether a role currently logging in has a privilege over a function before providing the function according to the predefined command from the application software, and refuse to provide the function if the role does not have the privilege.

8. The software platform of claim 1, wherein the client is further configured to provide a docbase standard interface.

9. The software platform of claim 1, comprising:
an application layer interface module, configured to call a Standard Call Level Interface (SCLI) parser in a SCLI parsing/generating module to parse SCLI protocol package sent from the application software, sending a parsing result to a SCLI distributing module for processing, and returning an SCLI protocol package from the SCLI distributing module to the application software;

the SCLI parsing/generating module comprising an SCLI parser and an SCLI generator; wherein, the SCLI parser is configured to parse the SCLI protocol package from the application software and the SCLI generator is configured to generate an SCLI protocol package in line with data which is inputted into the SCLI generator;

the SCLI distributing module, configured to call a function module in the software platform corresponding to the contents in the SCLI protocol package, call the SCLI generator in the SCLI parsing/generating module to encapsulate a result returned from the invoked function module into the SCLI protocol package, and return the SCLI protocol package to the application layer interface module;

the authentication/access control module, configured to provide functions of authentication and access control when called by the SCLI distributing module;

the document storage module, configured to provide functions including storage and managements of document and etc. when called by the SCLI distributing module;

a PDL translation module, configured to traverse contents on a document page when called by the SCLI distributing module, and call a rendering module according to a command on the document page to generate a bitmap;

the rendering module, configured to provide a 2-dimensional (2d) rendering function when called by the PDL parsing module.

10. A method for processing unstructured data, comprising: receiving, by a client, a predefined command from an application software, calling a function which is corresponding to the predefined command and which is in the client and/or in a server through network communications with the server to perform an operation; and providing, by the server, the function when called by the client; wherein the predefined command is independent from a storage form of the unstructured data and describes an operation on an instance of an abstract model; wherein the abstract model is obtained by abstracting presence effect of a certain type of unstructured documents.

11. The method of claim 10, wherein the predefined command is a command defined in advance for operating an instance of the abstract model a predefined model, and the predefined command is for initiating a physical operation on the unstructured data.

12. The method of claim 10, further comprising: storing, by the server, the unstructured data.

13. The method of claim 10, wherein the unstructured data comprise stream media data and/or document data.

14. The method of claim 10, wherein calling the function in the client to perform the operation comprises: presenting, by the client, the unstructured data: wherein the presenting comprises: rendering, displaying, printing and playing.

15. The method of claim 10, wherein calling the function in the client to perform the operation Comprises: the presenting comprises: creating unstructured data for any designated presence effect by sending a series of commands to the software platform which processes the unstructured data, wherein the created unstructured data have the same or similar presence effect.

16. The method of claim 10, further comprising: sending, by the client, a login request to the server; and authenticating, by the server, the client according to the login request before calling the function according to the predefined command of operating the unstructured data from the application software to perform the operation.

17. The method of claim 16, further comprising: verifying whether the application software holds a private key of a role by using a challenge/response mode during role login.

18. The method of claim 10, further comprising: verifying, by the server, whether a role currently logging in has a privilege over the function before providing the function when called by the client, and refusing to provide the function if the role does not have the privilege.

19. The method of claim 10, further comprising: verifying, by the client, whether a role currently logging in has a privilege over the function before providing the function according to the predefined command from the application software, and refusing to provide the function if the role does not have the privilege.

20. The method of claim 10, further comprising: supporting, by the client, a docbase standard interface.

21. A software platform for processing unstructured data, comprising two clients and a server; wherein a first, client of the two clients is configured to receive a first sequence of predefined commands from a first application software, and create unstructured data in the server according to the first sequence of predefined commands; a second client of the two clients is configured to receive a second sequence of predefined commands from a second application software; and provide, according to the second sequence of predefined commands, the second application software with data needed by the second application software in the unstructured data created by the first client in the server; the server is configured to store the unstructured data, communicate with the two clients over a network and provide a function when called by the two clients; wherein the predefined command is independent from a storage form of the unstructured data and describes an operation on an instance of an abstract model; wherein the abstract model is obtained by abstracting presence effect of a certain type of unstructured documents.

* * * * *